Patented Dec. 31, 1940

2,226,831

UNITED STATES PATENT OFFICE 2,226,831

PROCESS FOR THE MANUFACTURE OF DRYING OILS

Remmet Priester, Deventer, Netherlands, assignor to Naamlooze Vennootschap Industrieele Maatschappij Voorheen Noury & Van Der Lande, Deventer, Netherlands, a company of the Netherlands No Drawing. Application December 23, 1937, Serial No. 181,468. In the Netherlands February 10, 1937

7 Claims. (Cl. 260—411)

The present invention relates to a process of preparing a drying oil composition having a predetermined acid number, and the product thereby formed. More specifically the invention relates to a method as well as the product thereby formed, in which a glyceride oil such as castor oil is converted to a drying oil by heating the same in the presence of a suitable catalyst, and thereafter heating the product thus obtained in the presence of a mono- or poly-alcohol such as glycerol or sorbitol to form a composition such as a standoil, which has a predetermined acid number, i. e. in the neighborhood of 7 or has any higher or lower value as may be desired for some specified purpose.

It is well recognized that prior to this invention others have heated an oil such as castor oil with a dehydrating catalyst which does not have any oxidizing properties, to form a drying oil, but the great disadvantage of such a process is that in a short space of time the acid number of the oil rises sharply, when it is thereafter cooked with a gum to form a varnish or is heated to say 250–280° C. or higher to form a standoil of desired viscosity and body. This sharp rise of the acid number has according to my investigations to be distinguished from the slow and gradual increase of the acid number that is observed, if a drying oil of the type of linseed oil, is heated to a temperature of 250–280° C. in order to form a standoil.

In the specific examples which follow and which represent various methods of carrying out the present invention, attention is directed to the fact that numerous modifications falling within the scope of the present invention may be made, for example hydroxy glyceride oils other than castor oil (e. g. the triglyceride of hydroxy stearic acid), may be used, and furthermore this heating operation may be performed in the presence of inert gases such as nitrogen, carbon dioxide and the like. Also the oil may be heated either under increased or decreased pressure. In order to compensate the sharp and unexpected rise of the acid number of the oil produced (in the "thickening" process described, i. e.) by cooking with a gum or heating to form a standoil, the oil after the original or first heating operation in the presence of a catalyst (and which oil usually has a low acid number), is again heated to body the oil as in a varnish cooking operation or to form standoil, and in the second heating operation, an alcohol such as glycerol is added to the oil batch to be heated to produce a product having a desired acid number. In order to determine how much glycerol or other alcohol to add to the oil to give after the second heating or cooking operation, a final product of desired acid number, an aliquot portion of the oil (without any glycerine added) is heated at say 270° C. for 1½ to 3 hours and its acid number determined after the heating operation, and from this information the amount of glycerol or other alcohol required to be added to the oil batch to give a desired final acid number is calculated. The specific examples which follow give detailed instructions on this feature of the invention. Suitable dehydration catalysts that may be used in the process of my invention are e. g. sulphuric acid, persulphuric acid, monopersulphuric acid, pyrosulphuric acids and the normal and acid salts of these acids, such as sodium bisulphate, potassium persulphate, all of which are used in proportions of approximately 0.1–2.0% by weight of the oil. Furthermore sulphuric acid anhydride and phosphoric acid which are also used in amounts varying between 0.1–2.0%. Other suitable catalysts are the interaction products between sulphuric acid and oils having a hydroxy group in the fatty acid radical, such as sulphonated castor oil (Turkey red oil) and the sulphonated aromatic hydrocarbons, such as naphthalene disulphonic acids as well as the alkali salts of these acids, these catalysts being added in proportions of 0.5 to 5% by weight of the oil.

In the above list of dehydration catalysts, especial attention should be given to the persulphuric acid, mono-persulphuric acid and the salts of these, which substances are oxidizing in character and which are more rapid in their action, whereby the drying oils are more rapidly produced than when using non-oxidizing acids. The use of these substances is claimed in my copending application Ser. No. 181,467 filed concurrently herewith. Such substances are hereinafter included in the expression "persulphuric acid compound."

Example 1

1 kilogram of castor oil was heated while stirring with 2% by weight of sodium bisulphate. Water was given off at about 200° C. and then the temperature was slowly increased to 250° C. The mass was kept at this temperature for such a period of time that loss of water was no longer observed. From the oil thus obtained a standoil having an acid number of about 10 was prepared, by heating to 270° C. under a pressure of 15-25 mm. of mercury, by the following procedure.

First the acid number that would be obtained normally by cooking the oil in the normal kettle practice is determined by heating an aliquot portion of the oil, that is to say, ten grams of the oil at a pressure of 15-25 mm. of mercury for one hour at 270° C. and which aliquot portion of oil after cooling had an acid number of 27. The remaining portion of the oil was then heated with approximately 1% by weight of glycerol under the same pressure as mentioned above, and at a temperature of 270° C. for 3 hours, whereupon a standoil having a viscosity of 30 poises at 20° C. and having an acid number of 10, is obtained.

Example 2

1 kilogram of castor oil was mixed with 0.15% by weight of concentrated (98%) sulphuric acid. The mixture was heated under a pressure of 50 mm. of mercury, the water present began to distill off at about 170° C. and the reaction was completed at 220° C. A small aliquot portion, say 100 grams, of the reaction product was subsequently heated at normal atmospheric pressure for 30 minutes at 280° C., after which the acid number was determined and found to be 29. From the acid number thus determined, it was calculated that 1% by weight of glycerol should be added to the main portion of the oil to yield a final product having an acid number of 5 by heating the oil at 280° C. for 30 minutes.

Example 3

1 kilogram of castor oil was mixed with 0.2% by weight of concentrated sulphuric acid, and the mixture was heated at atmospheric pressure. At about 180° C. water was given off which loss of water was complete at 240° C. A small aliquot portion, i. e. 10 grams, was taken from the reaction product and heated at 270° C. for 1½ hours. The product thus obtained was found to have an acid number of 28. From this figure the amount of sorbitol required to yield a standoil having an acid number of 7 from the main portion of the oil was calculated as 11 grams, and half the amount of sorbitol was heated with the main portion of the oil at 260° C. for 1½ hours. After this the other half of the calculated quantity of sorbitol was added. The temperature was raised to 280° C. and maintained at this figure for 2 hours. The final product was a standoil having a viscosity of 30 poises, determined at 20° C., and having an acid number of 7.

Example 4

1 kilogram of castor oil was heated with a trace of concentrated sulphuric acid as described in the preceding example, and converted in the same manner into a rather thin liquid oil having a viscosity of 10 poises, determined at 20° C. and an acid number of 5. A preliminary test was carried out by heating a small quantity of the oil at 270° C. for 2 hours, after which the acid number was determined. The quantity of glycerol that was required to reduce this acid number to 5 was now calculated. The main portion of the drying oil was heated at 270° C. in the same manner as used in the preliminary test and the quantity of glycerol calculated by the preliminary test was gradually added. When the heating at a temperature of 270° C. has taken place for the desired period of time, the oil is quickly cooled. The drying oil thus obtained was particularly suitable as a raw material for the manufacture of varnishes, in which a resin or varnish gum is cooked with the oil for a prolonged period of time at a high temperature.

Example 5

The reaction product, obtained by heating hydrogenated castor oil with a trace of concentrated sulphuric acid as described in Example 3 is used for the manufacture of a plasticiser in the following way.

A preliminary test was carried out by heating a small portion of the oil at 260° C. for 2 hours, after which the acid number was determined. The quantity of cetyl alcohol required to reduce the fixed acid number to 5 is calculated as above. The main portion of the drying oil was then heated to 200° C. and an equal weight of an artificial resin known in the trade as Amberol F-7 (Abertol 209-L) was slowly added. As soon as the artificial resin was fully dissolved, the quantity of glycerol calculated from the data obtained by the preliminary test was added, and the mixture was stirred and heated further to 250° C. This temperature was maintained for such a time that the product gives a clear solution with turpentine and also remains clear after cooling. Subsequently so much of turpentine is added that on cooling the desired viscosity is obtained. Finally a drier was added and a varnish obtained which was highly suitable as a flatting or a furniture varnish.

To recapitulate briefly, the present invention constitutes an improvement over the known process of preparing a drying oil from an oil such as castor oil, hydroxy stearic acid glyceride and the like, by a two-stage heating operation. In the first stage the original oil is heated with a catalyst as for example in U. S. patent to Ufer No. 1,892,258, and in the second stage the oil is heated with an alcohol such as glycerol, sorbitol, glycol, pentaerythritol or with a compound like ethylene oxide for the purpose of imparting to the finished product a predetermined acid number. Since in the second heating stage, which would normally be carried out to form a standoil or a varnish from the drying oil prepared by processes such as described in the aforesaid U. S. Patent 1,892,-258, there would normally be a sudden sharp rise of the acid number of the oil because for example a top heat of 270° C. is often attained in standoil or varnish cooking, then this sharp rise of acid number is prevented or controlled, according to the present invention, by heating the said drying oil with an alcohol preferably a polyhydric alcohol such as glycerol, sorbitol or a high boiling monohydric alcohol such as cetyl alcohol or stearic alcohol. In order to determine the quantity of glycerol or other alcohol to be added to the drying oil to prevent during the heating or cooking operation, an acid number rise of undesired degree, a small aliquot portion of the oil produced by treating, say castor oil, according to the method described in the aforesaid Ufer patent or any equivalent process, is heated rapidly to about 250° C., or 270° C., for 30-60 minutes, and after cooling the acid number of the oil is determined by any standard method. It then becomes of course, merely a matter of simple arithmetic to add that amount of glycerine or other alcohol to the oil batch proper to be heated or cooked to obtain a final product with a predetermined acid number.

I claim:
1. The process of making and thickening dry- ing oils which comprises heating a glyceride oil containing a hydroxy acid radical in the presence of a small amount of a dehydrating catalyst and thereafter heating the thus produced oil in a process of utilizing such oil for the production of a thickened product, and having present in said latter heating step a quantity of an alcohol sufficient to esterify free acid present in the said oil and at least part of the amount of free acid which will be formed by said last mentioned heating of said oil.

2. The process of making and thickening drying oils which comprises heating a glyceride oil containing a hydroxy acid radical in the presence of a small amount of a dehydrating catalyst sufficiently to form a drying oil, and thereafter heating the thus produced drying oil in the conversion of the same into a thickened final product, and in said second heating step having present a predetermined quantity of an alcohol sufficient to produce a final product of predetermined acid number.

3. The process of making and bodying drying oils which comprises heating a glyceride oil containing a hydroxy acid radical in the presence of a small amount of a dehydrating catalyst and thereafter heat bodying the oil by a further heating operation at a temperature higher than the temperature used in the first mentioned heating step, and having present in said second heating step a sufficient amount of glycerol to esterify free acid including at least a substantial amount of the free acid to be produced in the said second heating step, so that the final product will have a predetermined acid number.

4. The process of making drying oils which comprises heating a glyceride oil containing a hydroxy acid radical in the presence of a small amount of a dehydrating catalyst which is a persulphuric acid compound, and thereafter heating the thus produced oil in a process of utilizing such oil for the production of a product, and having present in said latter heating step a quantity of an alcohol sufficient to esterify free acid present in the said oil and at least part of the amount of free acid which will be formed by said mentioned heating of said oil.

5. The process of making drying oils which comprises heating a glyceride oil containig a hydroxy acid radical in the presence of a small amount of a dehydrating catalyst which is a persulphuric acid compound, and thereafter heating the thus produced oil in the conversion of the same into a thickened final product, and in said second heating step, which includes heating to a temperature higher than that used in said first heating step, having present a predetermined quantity of an alcohol sufficient to produce a final product of predetermined acid number.

6. The process of making drying oils which comprises heating a glyceride oil containing a hydroxy acid radical in the presence of a small amount of a dehydrating catalyst which is a persulphuric acid compound and thereafter heat bodying the oil by a further heating operation at a temperature higher than the temperature used in the first mentioned step, and having present in said second heating step a sufficient amount of glycerol to esterify free acid including at least a substantial amount of the free acid to be produced in the said second heating step, so that the final product will have a predetermined acid number.

7. In the treatment of a drying oil resulting from the heat-treatment of castor oil with small amounts of an oxygen containing mineral acid selected from the group consisting of sulphuric acid, persulphuric acid, monopersulphuric acid, pyrosulphuric acid, phosphoric acid and sulphonic acids, the herein described step of bodying said drying oil at temperatures of over 250° C., in the presence of an amount of an alcohol sufficient to esterify a large part at least of the acid which would otherwise be liberated in said bodying operation.

REMMET PRIESTER.